US011040688B2

(12) United States Patent
Deng et al.

(10) Patent No.: US 11,040,688 B2
(45) Date of Patent: Jun. 22, 2021

(54) SIDE AIRBAG ASSEMBLY (71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 16/445,728

(22) Filed: Jun. 19, 2019

(65) Prior Publication Data

US 2020/0398783 A1    Dec. 24, 2020

(51) Int. Cl.
*B60R 21/207*   (2006.01)
*B60R 21/215*   (2011.01)
*B60R 21/231*   (2011.01)
*B60R 21/00*    (2006.01)

(52) U.S. Cl.
CPC .......... *B60R 21/215* (2013.01); *B60R 21/207* (2013.01); *B60R 21/23138* (2013.01); *B60R 2021/0006* (2013.01); *B60R 2021/21537* (2013.01); *B60R 2021/23146* (2013.01)

(58) Field of Classification Search
CPC ...... B60R 2021/21537; B60R 21/2155; B60R 21/2165; B60R 2021/21506; B60R 21/207; B60R 21/215
See application file for complete search history.

(56) References Cited

U.S. PATENT DOCUMENTS

| | | | |
|---|---|---|---|
| 5,013,064 A * | 5/1991 | Miller | B60R 21/21656 280/730.1 |
| 5,338,060 A | 8/1994 | Soderquist | |
| 5,687,987 A | 11/1997 | Spencer et al. | |
| 5,971,427 A | 10/1999 | Whited et al. | |
| 6,848,705 B2 * | 2/2005 | Schneider | B60R 21/21656 280/728.3 |
| 7,874,578 B2 | 1/2011 | Thomas et al. | |
| 7,905,514 B2 * | 3/2011 | Thomas | B60R 22/1954 280/733 |
| 10,913,421 B2 * | 2/2021 | Sung | B60R 21/207 |
| 2002/0175501 A1 * | 11/2002 | Jenkins | B60R 21/2165 280/728.3 |

FOREIGN PATENT DOCUMENTS

DE    19650665 A1    6/1998

* cited by examiner

*Primary Examiner* — Ruth Ilan
(74) *Attorney, Agent, or Firm* — Frank A. MacKenzie (57) ABSTRACT

A side airbag assembly includes a housing and an airbag in the housing. The housing has a top surface and a panel. The panel has a top end and a hinge connecting the top end to the top surface. The panel has a bottom end and two side ends extending from the top end to the bottom end. The panel has weakened joints at the bottom end and the side ends. The panel is rotatable relative to the top surface from an undeployed position to a generally upright position and the panel abuts the top surface in the generally upright position.

19 Claims, 6 Drawing Sheets

SIDE AIRBAG ASSEMBLY

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

A side airbag assembly includes a housing having a top surface and a panel. The panel has a top end and a hinge connecting the top end to the top surface. The panel has a bottom end and two side ends extending from the top end to the bottom end. The panel has weakened joints at the bottom end and the side ends. The panel is rotatable relative to the top surface from an undeployed position to a generally upright position. The panel abuts the top surface in the generally upright position. An airbag is in the housing.

The housing may have a corner and the panel may include the corner. The housing may have a generally rectangular cuboid shape including the corner. The panel may have an upper portion and a lower portion and the corner is between the upper portion and the lower portion. The upper portion of the panel may abut the top surface of the housing in the generally upright position. The upper portion of the panel may be generally horizontal and the lower portion of the panel may be generally vertical in the undeployed position. The housing may include a side panel connected to the panel along the upper portion and the lower portion at a weakened joint. The side panel may include a hinged end opposite the weakened joint. A lower panel may be connected to the bottom end of the panel and the side panel at a weakened joint. The lower panel may include a hinged end opposite the weakened joint. The upper portion may extend from the corner to the top end and the lower portion extends from the corner to the bottom end.

The top surface of the housing may be generally horizontal.

The top surface may extend away from the top end of the panel at an obtuse angle relative to the top end.

Reinforcing ribs may be on the panel.

The panel may be rigid relative to the top surface of the housing.

The housing may have a side panel connected to the side end of the panel at a weakened joint and having a hinged end opposite the weakened joint. The weakened joint may be designed to break when the airbag is inflated.

A lower panel may be connected to the bottom end of the panel at a weakened joint. The lower panel may include a hinged end opposite the weakened joint.

The housing may have an inboard shell, an outboard shell, and a hinge between the inboard shell and the outboard shell, the inboard shell being wider than the outboard shell in a cross-vehicle direction.

With reference to the Figures, wherein like numerals indicate like parts throughout the several views, a side airbag assembly 10 includes a housing 12 and an airbag 14 in the housing 12. The housing 12 has a top surface 16 and a panel 18. The panel 18 has a top end 20 and a hinge 22 connecting the top end 20 to the top surface 16. The panel 18 has a bottom end 24 and two side ends 26 extending from the top end 20 to the bottom end 24. The panel 18 has weakened joints 28 at the bottom end 24 and the side ends 26. The panel 18 is rotatable relative to the top surface 16 from an undeployed position to a generally upright position (FIGS. 2, 4, 6) and the panel 18 abuts the top surface 16 in the generally upright position.

Figure 1:
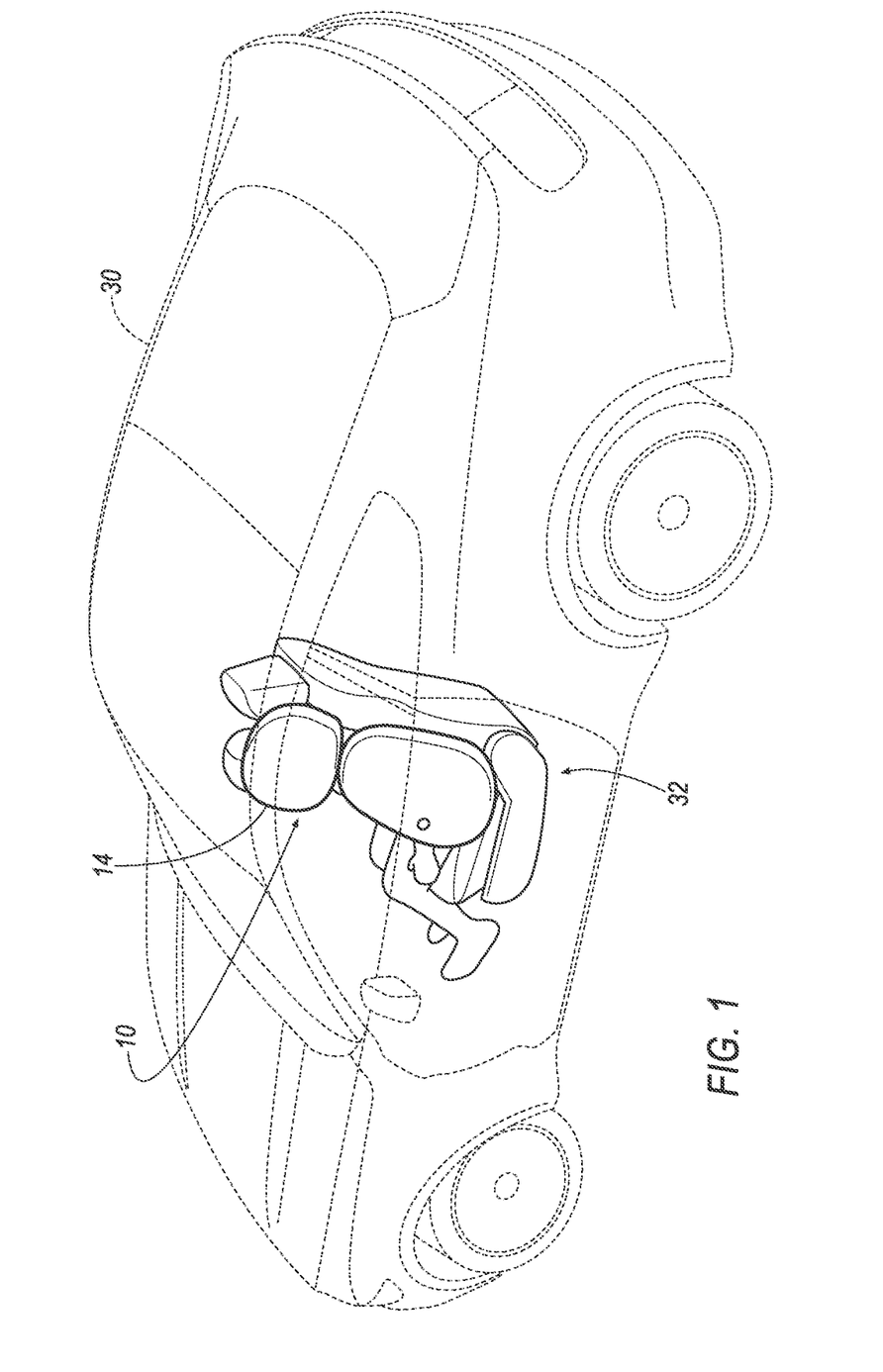
FIG. 1 is a perspective view of a vehicle with a side airbag assembly in an inflated position.
Figure 2:
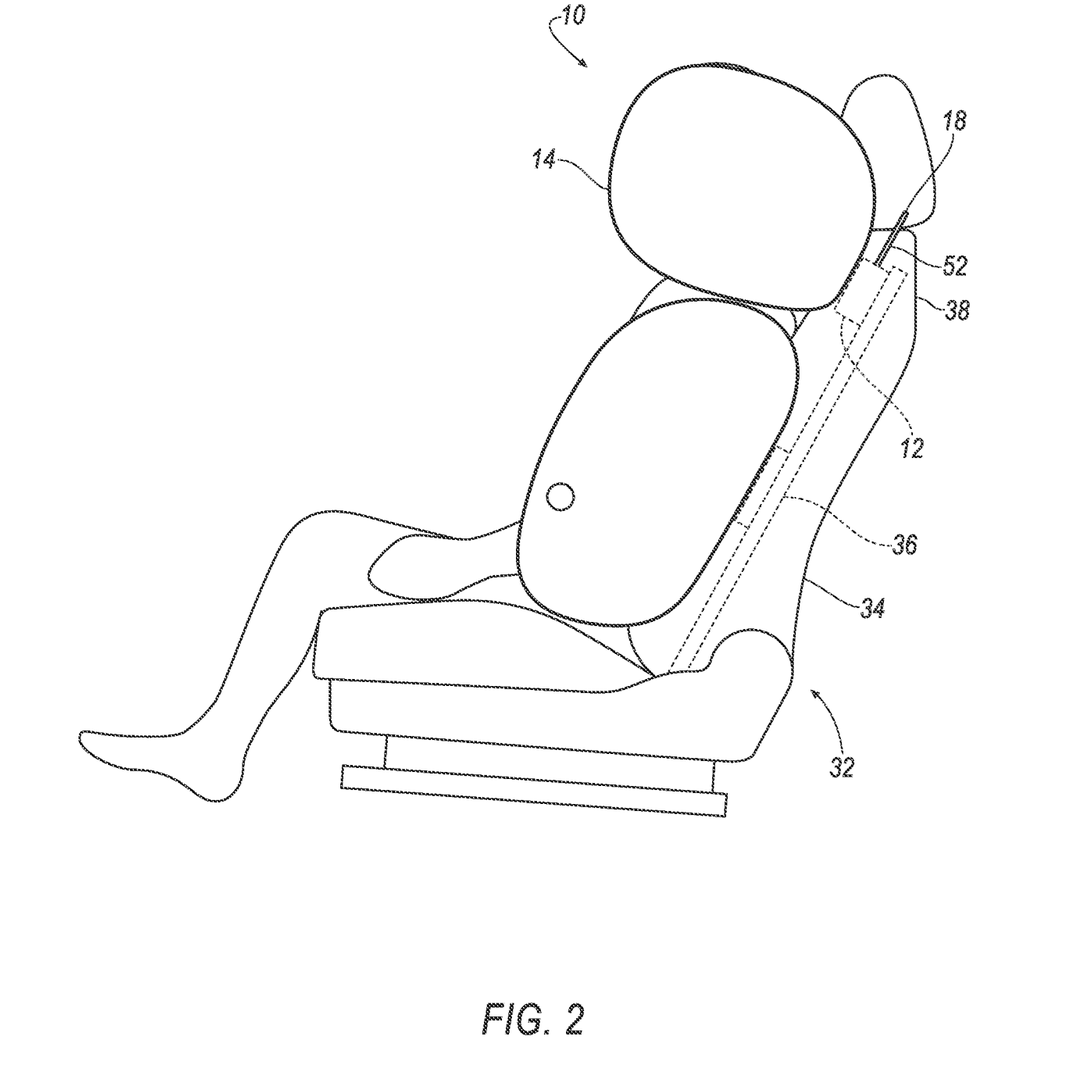
FIG. 2 is a side view of a seat and the side airbag assembly in the inflated position.

With reference to FIG. 2, the panel 18 directs the movement of the airbag 14 as the airbag 14 inflates from an uninflated position (FIG. 3) to the inflated position (e.g., FIGS. 1 and 2). Specifically, since the panel 18 abuts the top surface 16 in the generally upright position, as shown in FIGS. 2 and 4, the panel 18 is stopped in the generally upright position and guides inflation of the airbag 14 in the vehicle-forward direction and/or resists vehicle-rearward movement of the airbag 14, e.g., during a rebound after initial inflation.

The vehicle 30 may be any passenger or commercial automobile such as a car, a truck, a sport utility vehicle, a crossover vehicle, a van, a minivan, a taxi, a bus, etc. The vehicle 30 includes at least one seat 32. The seat 32 may be of any suitable type, e.g., a bucket seat, bench seat, etc. The seat 32 may be at any suitable location, e.g., a front seat, rear seat, driver seat, passenger seat, etc.

The airbag 14 is deployable between the occupant and a door of the vehicle 30. In the example shown in FIG. 1, the seat 32 is a front seat and the door is a front door. Alternatively, the seat 32 and door may be in any other suitable location, e.g., a rear seat and rear door. The seat 32 shown in FIG. 1 is a driver seat and, alternatively, the seat 32 may be a passenger seat. In any event, the side airbag 14 is deployable in the space between the seat 32 and the adjacent door.

The seat 32 includes the seatback 34 and a seat bottom (not numbered). The seatback 34 may be supported by the seat bottom and may be stationary or movable relative to the seat bottom. The seatback 34 and the seat bottom may be adjustable in multiple degrees of freedom. Specifically, the seatback 34 and the seat bottom may themselves be adjustable, in other words, adjustable components within the seatback 34 and/or the seat bottom, and/or may be adjustable relative to each other.

The seatback 34 may include a seatback frame 36 (FIG. 2) and a covering 38 supported on the seatback frame 36. The seatback frame 36 may include tubes, beams, etc. Specifically, the seatback frame 36 includes a pair of upright frame members (one of which is identified in FIG. 2). The upright frame members are elongated, and specifically, are elongated in a generally upright direction when the seatback 34 is in a generally upright position. The upright frame members are spaced from each other and the seatback frame 36 includes cross-members (not shown) extending between the upright frame members. The seatback frame 36, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 36 may be formed of a suitable metal, e.g., steel, aluminum, etc.

The covering 38 may include upholstery and padding. The upholstery may be cloth, leather, faux leather, or any other suitable material. The upholstery may be stitched in panel 18s around the frame. The padding may be between the covering 38 and the seatback frame 36 and may be foam or any other suitable material.

The seatback 34 may define an occupant seating area. The occupant may be disposed in the occupant seating area, as shown in the Figures. The occupant seating area may be on a front side of the seatback 34. The side airbag 14 may extend from the seatback 34 next to the occupant seating area to control occupant kinematics.

More than one side airbag assembly may be supported on the seatback 34, e.g., the upper side airbag assembly and the lower side airbag assembly shown in FIGS. 1-2. In such an example, the side airbag assembly 10 described herein may be positioned as the upper side airbag assembly as shown in FIGS. 1-2. As other examples, a single side airbag assembly 10 may be supported on the seatback 34, e.g., extending along the head and/or torso of the occupant, and in such examples the single side airbag assembly may be the side airbag assembly 10 described herein.

Figure 3:
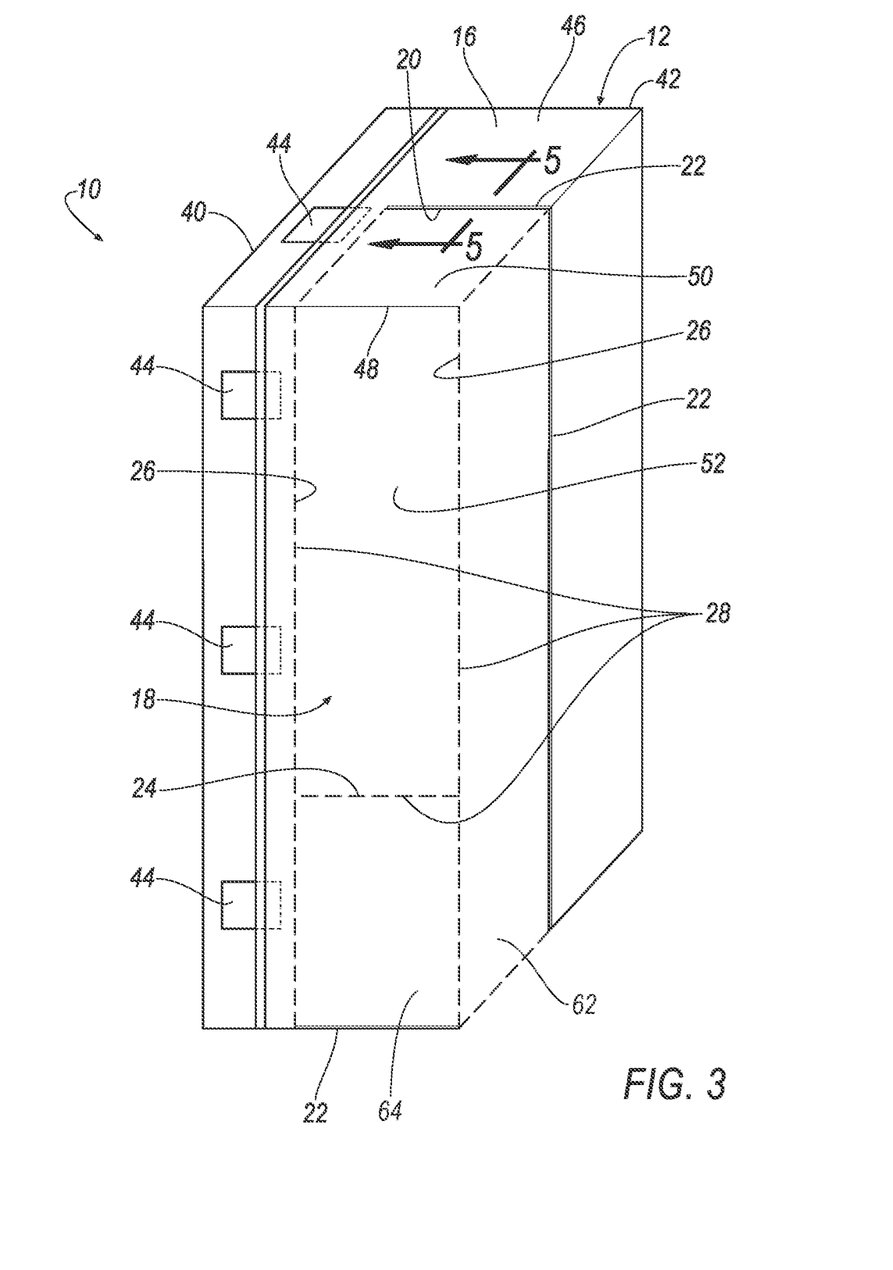
FIG. 3 is a perspective view of the side airbag assembly in an uninflated position.
Figure 4:
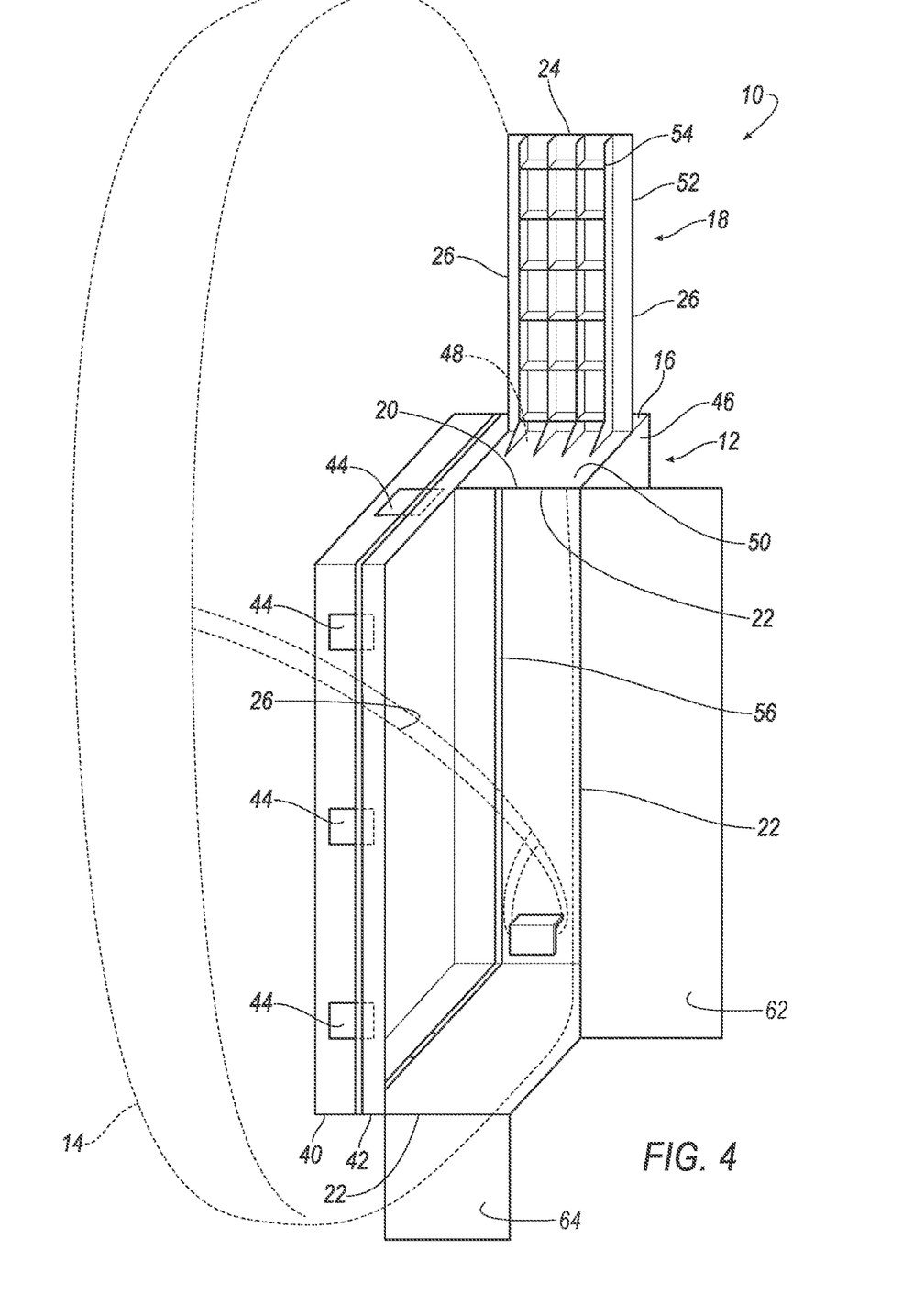
FIG. 4 is a perspective view of the side airbag assembly in the inflated position.

With reference to FIGS. 3 and 4, the housing 12 houses the airbag 14. As described below, the airbag 14 ruptures the housing 12 and expands from and is supported by the housing 12 as the airbag 14 inflates from the uninflated position to the inflated position.

The housing 12 is mounted to the seatback 34, e.g., to the upright frame member of the seatback frame 36. For example, the housing 12 may include locating elements, fasteners, etc., that engage the seatback 34 and/or fasteners may engage the housing 12 and the seatback 34 to mount the housing 12 to the seatback 34.

The housing 12 has two shells 40, 42 and a hinge 56, e.g., a living hinge, between the shells 40, 42. When closed, the shells 40, 42 define a cavity that houses the airbag 14. One of the shells 40, 42 may have engaging features 44 that engage the other of the shells 40, 42, e.g., spring-fingers on one of the shells that engage holes in the other of the shells, as shown in FIG. 3. As an example, one of the shells 40, 42 may be an inboard shell 40 and other of the shells may be an outboard shell 42 (with "inboard" and "outboard" referring to the relative position of the shells in a cross-vehicle direction). The outboard shell 42 may be wider than the inboard shell 42 in a cross-vehicle direction, i.e., the hinge 56 may be off-center.

The housing 12 may have a generally rectangular cuboid shape including, i.e., having three pairs of generally planar, parallel faces connected at twelve corners. In this context, "generally" means that one or more of the faces may slightly deviate from planar and/or one or more of the corners may be slightly rounded.

The housing 12 has a body 46, the panel 18, a side panel 62, and a lower panel 64. In the example where the housing 12 includes the shells 40, 42, when the shells 40, 42 are closed together, e.g., as shown in FIG. 3), the body 46, the panel 18, the side panel 62, and the lower panel 64 are formed by the shells 40, 42. Specifically, the body 46 may be formed by both shells 40, 42. The panel 18, the side panel 62, and the lower panel 64 may be formed by the same one shell, e.g., the outboard shell 42. The body 46, the panel 18, the side panel 62, and the lower panel 64 may be of the same type of material. As another example, the panel 18 may be of a different type of material than the body 46 the side panel 62, and the lower panel 64, as described further below. The housing 12 may be, for example, plastic or any other suitable material.

Figure 5:
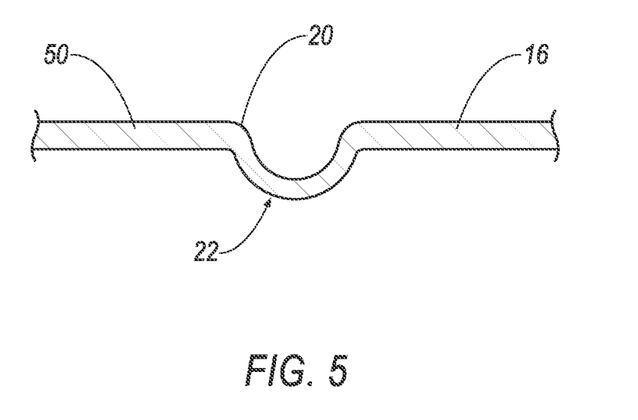
FIG. 5 is a cross-sectional view at line 5 in FIG. 3.

The panel 18, the side panel 62, and the lower panel 64 are connected to the body 46 with hinges 22. The hinges 22 may be, for example, living hinges, i.e., an area of relatively high flexibility caused by geometry and/or changes in thickness. An example of the living hinge is shown in FIG. 5, which is a cross-section along line 5 in FIG. 3. The hinges 22 at the panel 18, the side panel 62, and the lower panel 64 may be the same as each other or may be different.

Figure 6:
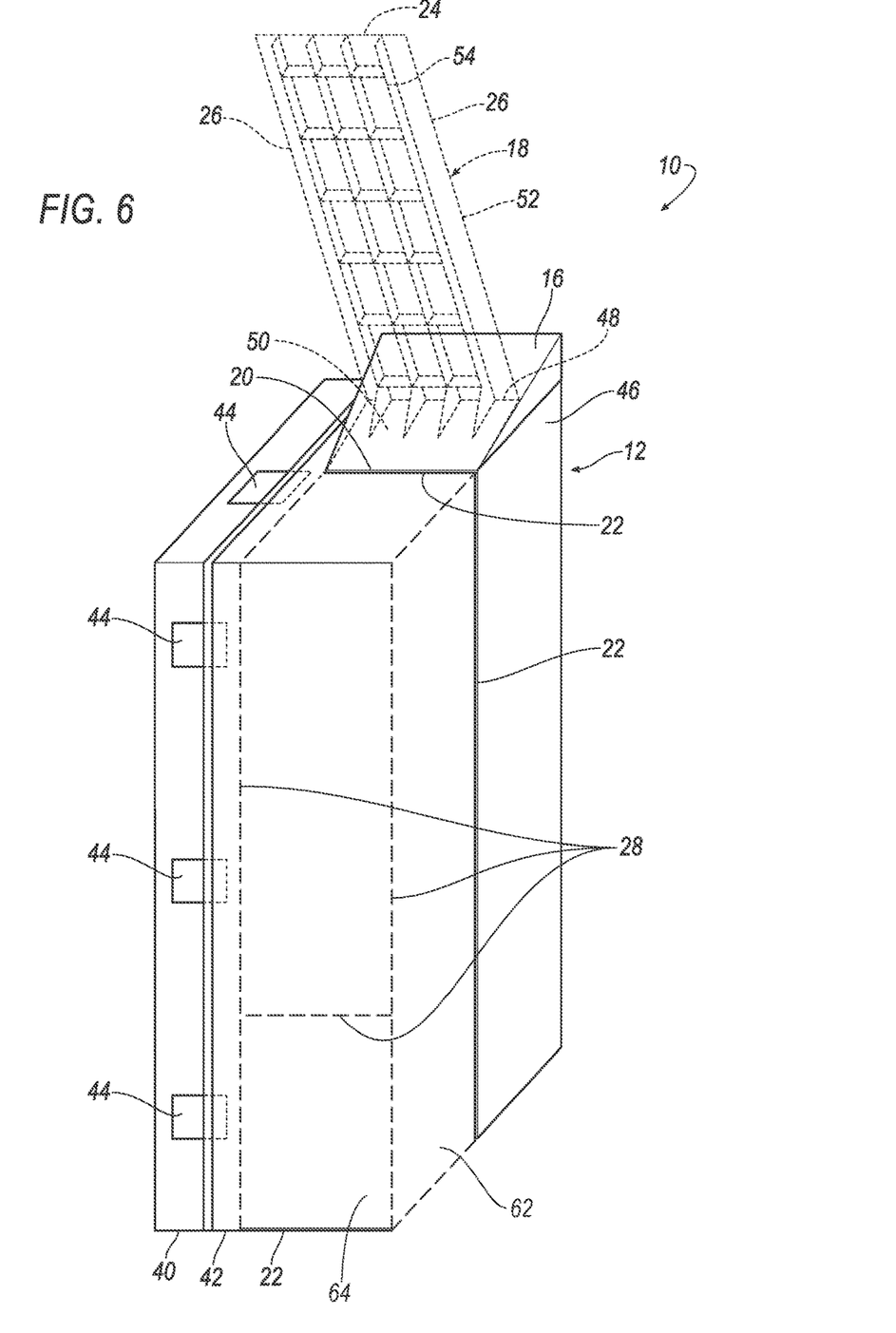
FIG. 6 is a perspective view of another embodiment of the airbag assembly.

The body 46 includes the top surface 16. The top surface 16 may be coplanar with the upper top end 20 of the panel 18, as shown in FIGS. 3-4. In other words, the top surface 16 extends away from the top end 20 of the panel 18 in a common plane with the top end 20. As another example, the top surface 16 extends away from the top end 20 of the panel 18 at an obtuse angle relative to the top end 20, as shown in FIG. 6.

The housing 12 includes several weakened joints 28 (indicated with broken lines in FIG. 3). The weakened joints 28 are designed to break when the airbag 14 is inflated, i.e., the force of the inflation of the airbag 14 breaks the joints and allows the airbag 14 to exit the housing 12 to the inflated position. The weakened joints 28 may be, for example, perforated lines, lines of thinned material, etc.

The side panel 62 is connected to the panel 18, the lower panel 64, and the body 46 at weakened joints 28. The panel 18 is connected to the side panel 62, the lower panel 64, and the body 46 at weakened joints 28. The lower panel 64 is connected to the panel 18, the side panel 62, and the body 46 at weakened joints 28. The side panel 62 is connected to the panel 18, the lower panel 64, and the body 46 at weakened joints 28.

The panel 18 has a bottom end 24 and two side ends 26 extending from the top end 20 to the bottom end 24. The bottom end 24, side ends 26, and top end 20 are terminal, i.e., where the panel 18 terminates. The panel 18 has an upper portion 50 and a lower portion 52 and at least a portion of one of the corners 48 is between the upper portion 50 and the lower portion 52. In other words, the panel 18 includes at least a portion of one of the corners 48. This gives the panel 18 an L-shape. The upper portion 50 is at the top end 20 and extends along the side ends 26 to the corner 48. The lower portion 52 is at the bottom end 24 and extends along the side ends 26 to the corner 48.

The upper portion 50 of the panel 18 is generally horizontal and the lower portion 52 of the panel 18 is generally vertical in the undeployed position. The top surface 16 of the housing 12 may be generally horizontal. General deviation of the top surface 16 and the upper portion 50 from exact horizontal and the lower portion 52 from exact vertical may be, at least in part, based on the adjustable recline angle of the seatback 34 relative to the seat bottom.

The weakened joints 28 connect the panel 18 to the body 46 at one side end 26, the panel 18 to the side panel 18 at the other side end 26, and the panel 18 to the lower panel 18 at the bottom end 24. The upper portion 50 of the panel 18 has a hinged end, i.e., the top end 20 at the hinge 22, opposite the weakened joint 28 at the bottom end 24. Specifically, the hinge 22 connects the top end 20 of the panel 18 to the top surface 16 of the body 46. The side panel 18 has a hinged end, i.e., at the hinge 22 between the side panel 18 and the body 46 opposite the weakened joint 28 that is between the side panel 18 and the panel 18. The lower panel 18 has a hinged end, i.e., at the hinge 22 between the lower panel 18 and the body 46 and opposite the weakened joint 28 that is between the side panel 18 and the panel 18.

As set forth above, the panel 18 is rotatable relative to the top surface 16 from an undeployed position (FIG. 3) to a generally upright position (FIGS. 4 and 6). In other words, when the inflation of the airbag 14 breaks the weakened joints 28, the panel 18 is free to rotate about the hinge 22 between top end 20 of the panel 18 and the top surface 16. In the undeployed position, the weakened joints 28 connect the panel 18 to the body 46, the lower panel 18, and the side panel 18. As the airbag 14 inflates toward the inflated position, the airbag 14 breaks the weakened joints 28 and rotates the panel 18 about the hinge 22 between the panel 18 and the top surface 16 thus moving the panel 18 to the generally upright position.

In the generally upright position, the lower portion 52 of the panel 18 is positioned to guide inflation of the airbag 14, e.g., an upper portion 50 of the airbag 14, in the vehicle-forward direction and/or resists vehicle-rearward movement of the airbag 14. In the generally upright position, the lower portion 52 is behind the inflating airbag 14, i.e., in a direction opposite the forward inflation direction of the airbag 14. The lower portion 52 extends upwardly from the upper portion 50 in the generally upright position. The direction of extension of the lower portion 52 from the upper portion 50 in the generally upright position has a vertical component. The recline angle of the seatback 34 relative to the seat bottom affects the vertical component of the lower portion 52 in the generally upright position. In addition, the relative position of the top surface 16 affects the vertical component of the lower portion 52 in the generally upright position. For example, as described above, the top surface 16 may be coplanar with the upper top end 20 of the panel 18, as shown in FIGS. 3-4, or the top surface 16 may extend away from the top end 20 of the panel 18 at an obtuse angle relative to the top end 20, as shown in FIG. 6.

The panel 18 abuts the top surface 16 of the body 46 in the generally upright position. Specifically, the upper portion 50 of the panel 18 abuts the top surface 16 of the housing 12 in the generally upright position. As set forth above, the inflation of the airbag 14 rotates the panel 18 to the generally upright position and the abutment of the upper portion 50 against the top surface 16 stops rotation of the panel 18 at the generally upright position. This stops the lower portion 52 so that the lower portion 52 acts as a reaction surface for the airbag 14.

The panel 18 is designed to resist vehicle-rearward movement of the airbag 14 during inflation, i.e., without breaking the panel 18 or before breaking the panel 18. The panel 18 is sufficiently rigid to act as a reaction surface for the inflating airbag 14. The panel 18 may have reinforcing ribs 54 to increase the rigidity of the panel 18. The reinforcing ribs 54 may extend along the lower portion 52, the corner 48, and the upper portion 50. The reinforcing ribs 54 may be on an inside surface and/or an outside surface of the panel 18. The panel 18 may be rigid relative to the top surface 16 of the housing 12, e.g., due to material thickness, difference in material, and/or the reinforcing ribs 54, etc.

The airbag 14 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 14 may include an internal tether 58, i.e., in an inflation chamber of the airbag 14. The housing 12 may include a tether hook 60, e.g., fixed to the body inside the cavity of the housing 12. The internal tether 58 may extend from the tether hook 60 to the airbag 14 in the inflation chamber. The tether hook 60 may be integral with the housing 12, i.e., a one-piece unit formed together (for example by plastic injection molding). Alternatively, the tether hook 60 may be formed separately from the housing 12 and subsequently attached to the housing 12.

An inflator (not shown) is in fluid communication with the airbag 14. The inflator expands the airbag 14 with inflation medium, such as a gas, to move the airbag 14 from the uninflated position to the inflated position. The inflator may be supported by any suitable component. For example, the inflator may be supported by the housing 12, e.g., in the housing. The inflator may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chamber to deliver inflation medium directly to the inflation chamber or may be connected to the inflation chamber through fill tubes, diffusers, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A side airbag assembly comprising:
   a housing having a top surface and a panel;
   the panel having a top end and a hinge connecting the top end to the top surface, the panel having a bottom end and two side ends extending from the top end to the bottom end, and the panel having weakened joints at the bottom end and the side ends;
   the panel being rotatable relative to the top surface from an undeployed position to a generally upright position, the panel abutting the top surface in the generally upright position; and
   an airbag in the housing.

2. The side airbag assembly as set forth in claim 1, wherein the housing has a corner and the panel includes the corner.

3. The side airbag assembly as set forth in claim 2, wherein the housing has a generally rectangular cuboid shape including the corner.

4. The side airbag assembly as set forth in claim 2, wherein the panel has an upper portion and a lower portion and the corner is between the upper portion and the lower portion.

5. The side airbag assembly as set forth in claim 4, wherein the upper portion of the panel abuts the top surface of the housing in the generally upright position.

6. The side airbag assembly as set forth in claim 4, wherein the upper portion of the panel is generally horizontal and the lower portion of the panel is generally vertical in the undeployed position.

7. The side airbag assembly as set forth in claim 4, wherein the housing includes a side panel connected to the panel along the upper portion and the lower portion at one of the weakened joints at one of the side ends.

8. The side airbag assembly as set forth in claim 7, wherein the side panel includes a hinged end opposite the one of the weakened joints at the one of the side ends.

9. The side airbag assembly as set forth in claim 8, further comprising a lower panel connected to the bottom end of the panel by the weakened joint at the bottom end of the panel and connected the side panel at an additional weakened joint, and the lower panel includes a hinged end opposite the weakened joint at the bottom end of the panel.

10. The side airbag assembly as set forth in claim 2, wherein the upper portion extends from the corner to the top end and the lower portion extends from the corner to the bottom end.

11. The side airbag assembly as set forth in claim 1, wherein the top surface of the housing is generally horizontal.

12. The side airbag assembly as set forth in claim 1, wherein the top surface extends away from the top end of the panel at an obtuse angle relative to the top end.

13. The side airbag assembly as set forth in claim 1, further comprising reinforcing ribs on the panel.

14. The side airbag assembly as set forth in claim 1, wherein the panel is rigid relative to the top surface of the housing.

15. The side airbag assembly as set forth in claim 1, wherein the housing has a side panel connected to one of the side ends of the panel at one of the weakened joints and having a hinged end opposite the one of the weakened joints.

16. The side airbag assembly as set forth in claim 15, wherein the weakened joint is designed to break when the airbag is inflated.

17. The side airbag assembly as set forth in claim 1, further comprising a lower panel connected to the bottom end of the panel at an additional weakened joint.

18. The side airbag assembly as set forth in claim 17, wherein the lower panel includes a hinged end opposite the additional weakened joint.

19. The side airbag assembly as set forth in claim 1, wherein the housing has an inboard shell, an outboard shell, and a hinge between the inboard shell and the outboard shell, the outboard shell being wider than the inboard shell in a cross-vehicle direction.

* * * * *